US006199036B1

(12) United States Patent
Ahmadi

(10) Patent No.: US 6,199,036 B1
(45) Date of Patent: Mar. 6, 2001

(54) TONE DETECTION USING PITCH PERIOD

(75) Inventor: Masoud Ahmadi, Harlow (GB)

(73) Assignee: Nortel Networks Limited, Ontario (CA)

( * ) Notice: Subject to any disclaimer, the term of this patent is extended or adjusted under 35 U.S.C. 154(b) by 0 days.

(21) Appl. No.: 09/382,852

(22) Filed: Aug. 25, 1999

(51) Int. Cl.[7] ..................... G10L 21/02

(52) U.S. Cl. ..................... 704/207; 704/201; 704/203

(58) Field of Search ..................... 704/207, 208, 704/205, 206, 272, 200, 201, 209, 258, 214, 223, 203; 381/104; 379/386; 370/202, 389; 463/41–42; 435/321

(56) References Cited

U.S. PATENT DOCUMENTS

| | | | | |
|---|---|---|---|---|
| 4,045,620 | * | 8/1977 | Westbrook | 379/290 |
| 4,386,239 | * | 5/1983 | Chien | 379/386 |
| 4,539,435 | * | 9/1985 | Eckmann | 379/76 |
| 4,653,098 | * | 3/1987 | Nakata et al. | 704/207 |
| 5,907,793 | * | 5/1999 | Reams | 348/13 |
| 5,937,060 | * | 8/1999 | Oh | 379/286 |
| 5,971,854 | * | 10/1999 | Pearson et al. | 463/41 |

OTHER PUBLICATIONS

Digital Processing of Speech Signals by Lawrence R Rabiner & Ronald W Schafer—pp. Nos.: Cover/Inside Cover, 126–141, 150–158, 314–319, 372–379.

Detection of Multi–tone Signals based on Energy Operators—Edger F Velez.

Tone Detection using Wavelet Transforms—Glenn A Shelby.

Dual Tone Detection by Goertzel Algorithm.

* cited by examiner

*Primary Examiner*—Richemond Dorvil
*Assistant Examiner*—Daniel A. Nolan
(74) *Attorney, Agent, or Firm*—Lee, Mann, Smith, McWilliams, Sweeney & Ohlson

(57) ABSTRACT

Tone detection in a telecommunication system uses an auto correlation algorithm to detect pitch period, then matches this with known pitch periods for the tones. Enhanced reliability or speed of detection and reduction in computational load can be achieved. This can improve quality of echo cancellation where cancellers treat tones differently to speech. Similarly with speech coding, since implementation of some coding standards involves tones being treated differently to speech. The auto correlation output can be used both for noise detection and tone detection, to save computational resource.

16 Claims, 6 Drawing Sheets

201
INPUT SIGNAL
HPF
202
200 (FROM FIG 1)
210
NOISE DETECTION
PITCH-DETECTION (ACF)
203
NOISE DETECTION BY ZCR & ENERGY LEVEL
204
LOGICAL UNIT (FINAL STATE DECISION)
205
FLAG
ADAPTIVE FILTER
208
NOISE CANCELLATION
206
209
+
-
207
OUTPUT SIGNAL

300
BUFFER DATA FROM FRAME
310
OBTAIN ACF PROFILE
320
MAX VALUE OF THE PROFILE
330
IS MAX VALUE > K·R(0)?
NO
YES
PITCH PERIOD
340
NOISE DETECTION DISCRIMINATION LOGIC
350
TONE DETECTION DISCRIMINATION LOGIC

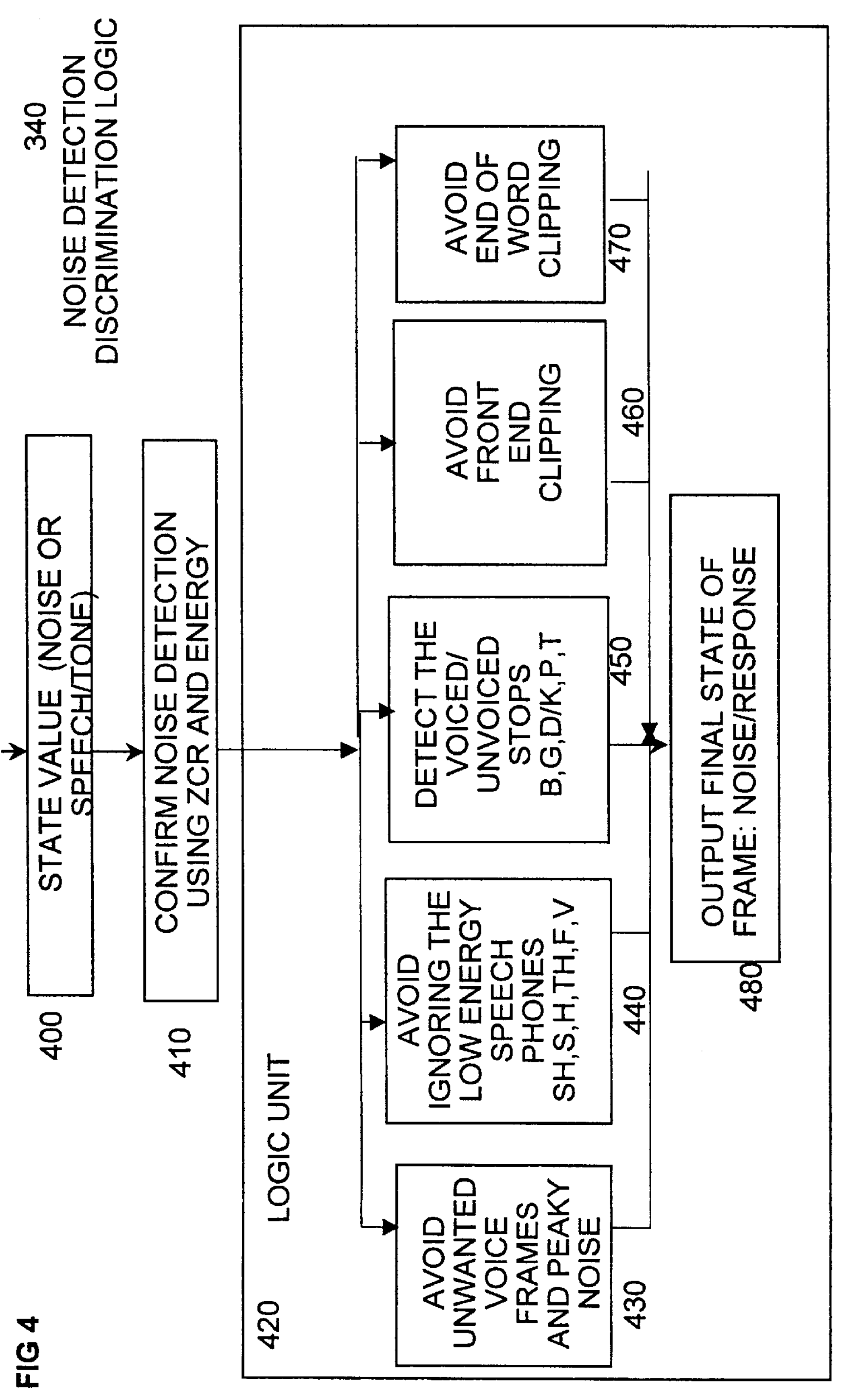
FIG 4
340
NOISE DETECTION DISCRIMINATION LOGIC
STATE VALUE (NOISE OR SPEECH/TONE)
400
CONFIRM NOISE DETECTION USING ZCR AND ENERGY
410
LOGIC UNIT
420
AVOID UNWANTED VOICE FRAMES AND PEAKY NOISE
430
AVOID IGNORING THE LOW ENERGY SPEECH PHONES SH,S,H,TH,F,V
440
DETECT THE VOICED/ UNVOICED STOPS B,G,D/K,P,T
450
AVOID FRONT END CLIPPING
460
AVOID END OF WORD CLIPPING
470
OUTPUT FINAL STATE OF FRAME: NOISE/RESPONSE
480

PITCH VALUE
511
IS THIS A TONE?
NO

YES
512
SINGLE TONE ?
YES
513
CHECK FOR THRESHOLD
NO
ANALOGUE DTMF
514
ANALOGUE OR DIGITAL?
DIGITAL DTMF
515
ANALOGUE THRESHOLD
DIGITAL THRESHOLD
516
517
SET FLAG FOR ECAN
TONE DETECTION TO FLAG TO ECAN
518

TONE DETECTION USING PITCH PERIOD

RELATED APPLICATIONS

This application relates to copending U.S. patent application Ser. No. 09,332,365 (Nortel Networks reference no 10641) entitled "NOISE DETECTION USING PITCH PERIOD", filed concurrently and hereby incorporated by reference in its entirety.

FIELD OF THE INVENTION

The invention relates to apparatus for detecting a tone, to signal processing apparatus, to echo cancelling apparatus, to speech coding apparatus, to corresponding methods, to methods of using a telecommunications network to make a call, and to corresponding software.

BACKGROUND TO THE INVENTION

Tone detection has a variety of applications in telecommunications systems. Tones can be used for transmitting data, or for signalling purposes for example. They can include pure tones such as fax, modem, dial tone, continuity tone as well as multi-frequency tones such as DTMF (Dual Tone Multi-Frequency), R1 and R2 signalling. In this context, the term "tone" is not intended to encompass tones occurring as part of human speech, for example in tonal languages such as Chinese.

Accurate detection of tones may be critical for maintaining low error rates for data transmission, or for proper operation of switches or other network equipment which relies on signalling tones. Particularly where tones are carried on speech circuits, it can be difficult to distinguish the tones because speech may show the same frequencies for short periods. It can be important to recognise tones quickly, particularly in switches containing echo cancellation circuits that need to be switched off when tones are detected. An example is an adaptive echo canceller, which adapts to speech. Tones in the speech band can affect the operation of such echo cancellation circuits since they will try to alter their coefficients to adapt to the tones. This is undesirable since when speech reoccurs, the canceller will take longer to readapt to the speech, and so echoes may be heard.

Conventional DTMF detection methods use bandpass filter banks and envelope detectors to estimate the level of each of the eight possible frequency components. The frequencies with the highest levels are selected as candidates for DTMF signal. Further processing is required to discriminate real DTMF tones from voice signals or other energy in the voice band. An example is shown in proceedings of the IEEE-SP International Symposium 1994 'Detection of multi-tone signals based on energy operators', Edgar F. Velez.

It is also known to use digital signal processors (DSP) to perform evaluation of the discrete Fourier transform (DFT) of the signal using algorithms such as the Goertzel algorithm. Conventional methods may be insufficiently reliable, or take too long, or use too much computational resource.

In many cases, there is a limited amount of computing resource available to carry out tone detection operations, particularly in switches where many signals or channels are handled simultaneously. In such cases, reductions in processing requirements per channel can enable greater channel density, which may be commercially very valuable.

In the book "digital processing of speech signals" by Raminer & Schafer published in 1978, ISBN 0-13-213603-1, there is discussion of pitch period detection at Pages 314–319, 372–379 and 150–158. It is used for estimating fundamental frequency in voice signals for speech recognition, to determine whether the speech is voiced or unvoiced, and to enable the speech to be compared to models. At Page 135 it is indicated that pitch period detectors are used in vocoders, in speaker identification and verification systems, and as aids to the handicapped.

Various ways of determining pitch period are known, including an impulse train algorithm shown at Page 136, which is very computationally intensive, a Fourier representation technique shown at Page 314 onwards, and an auto correlation function approach using centre clipping, shown at Pages 150–158.

It is known from U.S. Pat. No. 5,678,221 to detect and use pitch period of a signal to replace a noisy portion of a voice signal with a stored section of the signal before the noise, the stored section being repeated at pitch period intervals. However, there is no suggestion of using pitch period to detect tones as distinct from speech.

SUMMARY OF THE INVENTION

According to a first aspect of the invention there is provided apparatus for detecting a tone in an input signal, the apparatus comprising:

- a pitch period detector for detecting a pitch period in the input signal, and
- a discriminator for determining the presence of the tone according to the detection of the pitch period.

An advantage of using pitch period is that it can be more reliable, or work faster or can use less computation resources than other methods. The reduced computational load in particular can enable channel density to be increased for systems handling many channels. Channel density is a key metric that is commercially significant. The increased speed of detection can be vital in applications such as speech coding, since implementation of some coding standards involves treating tones differently to speech. The increased reliability can be useful for applications such as echo cancellation Preferred Features Preferably the pitch period detector comprises an auto correlator for outputting an auto correlation function of the input signal. This can be less computationally intensive than other methods such as frequency domain methods such as Fourier analysis. It is often easier to implement, simpler to program, and gives reliable results.

Preferably, the pitch period detector comprises a peak detector for detecting a peak in the auto correlation function and a comparator for comparing the peak with a total signal power of the input signal, to detect a pitch period. This gives a good indication of periodicity, independent of power level, is relatively easy to implement, and avoids complex recalculation of thresholds.

Preferably the auto correlation function is calculated for selected offsets which have durations corresponding to a range of pitch periods for a human voice. The calculation of the auto correlation function is typically the most computationally intensive part. If the calculation is not made for every possible offset, a great reduction in the amount of calculation can be achieved, without affecting the quality of detection.

Preferably, the discriminator compares a detected pitch period with a predetermined pitch period corresponding to a given tone, to discriminate the presence of that tone. This enables processing to be simplified and rapid.

Preferably the discriminator determines the pitch periods of a sequence of samples, and discriminates from the sequence, the presence of the tone.

Preferably the detected pitch period is used both for noise detection and for tone detection.

Other Aspects of the Invention

Another aspect of the invention provides an echo canceller comprising the tone detector.

Another aspect of the invention provides a speech coder comprising the tone detector.

Another aspect of the invention provides a method of detecting a tone.

Another aspect of the invention provides software for carrying out the method of detecting a tone.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which:

FIG. 4 shows steps in the operation of the logical unit part of the noise detection arrangement of FIG. 2;

DETAILED DESCRIPTION

Figure 1:
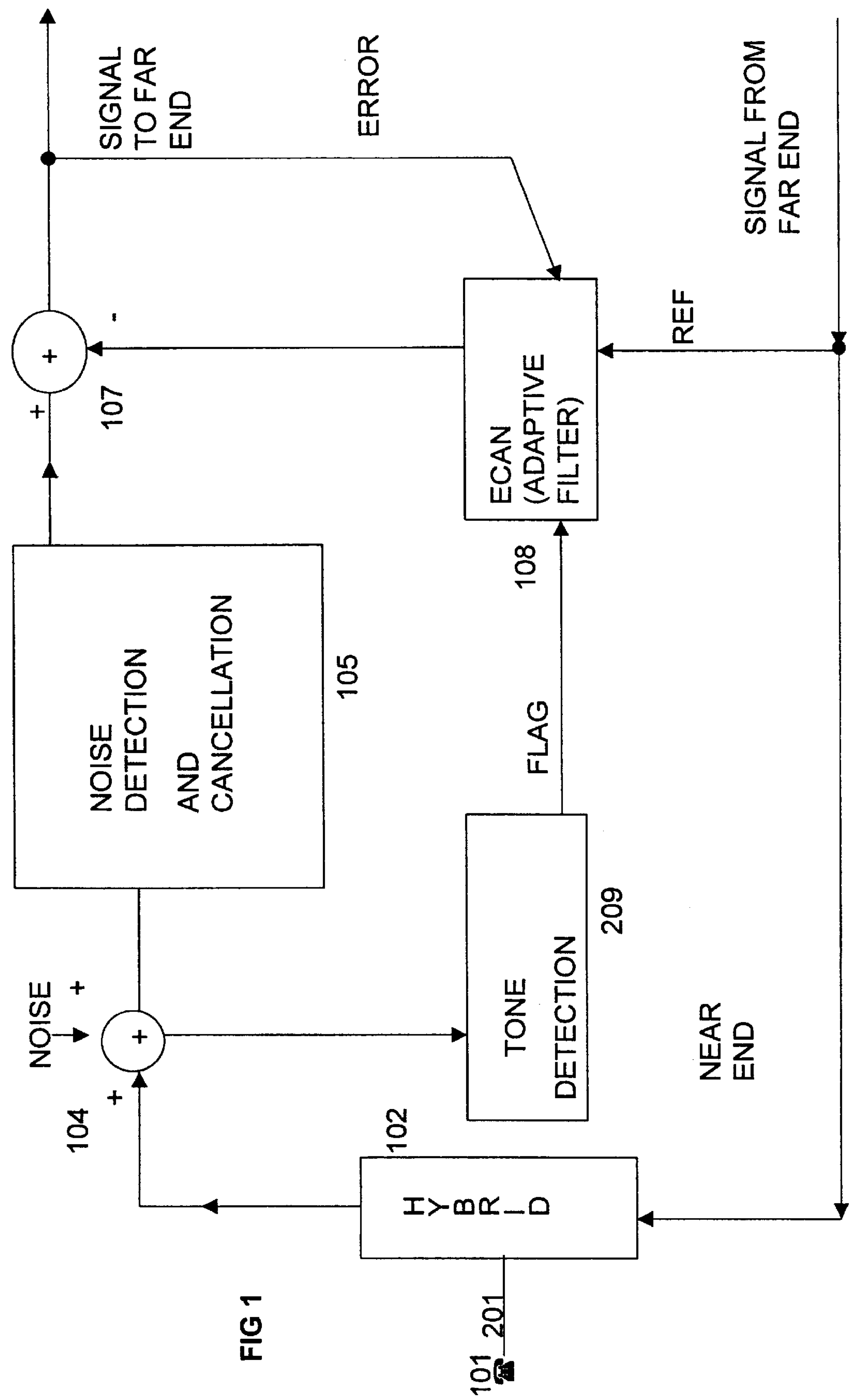
FIG. 1 shows in schematic form some of the elements at a near end of a voice transmission circuit.

FIG. 1, Schematic of Near End of Voice Circuit

FIG. 1 shows one example of the use of noise detection, to discriminate between noise or silence and voice or tones in a signal. Other possible applications for noise detection will be apparent, as discussed above. The figure also illustrates an embodiment of tone detection. Again there are a variety of other applications for tone detection, as discussed above.

The figure shows the principal elements in a single voice circuit, at the near end. Most of the elements are typically incorporated in a local exchange or local office, connecting a subscriber line 201 to a trunk in the public service telephone network (PSTN).

A telephone hand set 101 is illustrated, coupled by the subscriber line to a hybrid 102. This couples the bidirectional subscriber line to two separate unidirectional lines for longer distance transmission. Outward going signals from the user are fed to the noise detection and cancellation circuitry 105. The addition of noise from various sources as discussed above is shown by item 104. The outgoing signal is also fed to the tone detection unit 209. An echo canceller (ECAN) 108 is shown having an output to a summing function 107. The echo canceller receives a flag from the tone detection unit, and receives the incoming signal (REF) from the far end, and adaptively produces a signal representing the echo, to enable the echo to be cancelled. Echo is caused by mismatch in the hybrid 102. The principles of operation of echo cancellers are well known and need not be described further here.

Nevertheless, notably there is an input from the tone detection unit 209 into the ECAN so that the ECAN does not try to adapt to tones. Otherwise when speech occurs, the ECAN will take more time to readapt its coefficients to the speech, and so echo will be heard. Notably the noise detection and cancellation element precedes the ECAN because the performance of the ECAN will be disproportionately dependent upon how much noise is introduced at the near end.

Figure 2:
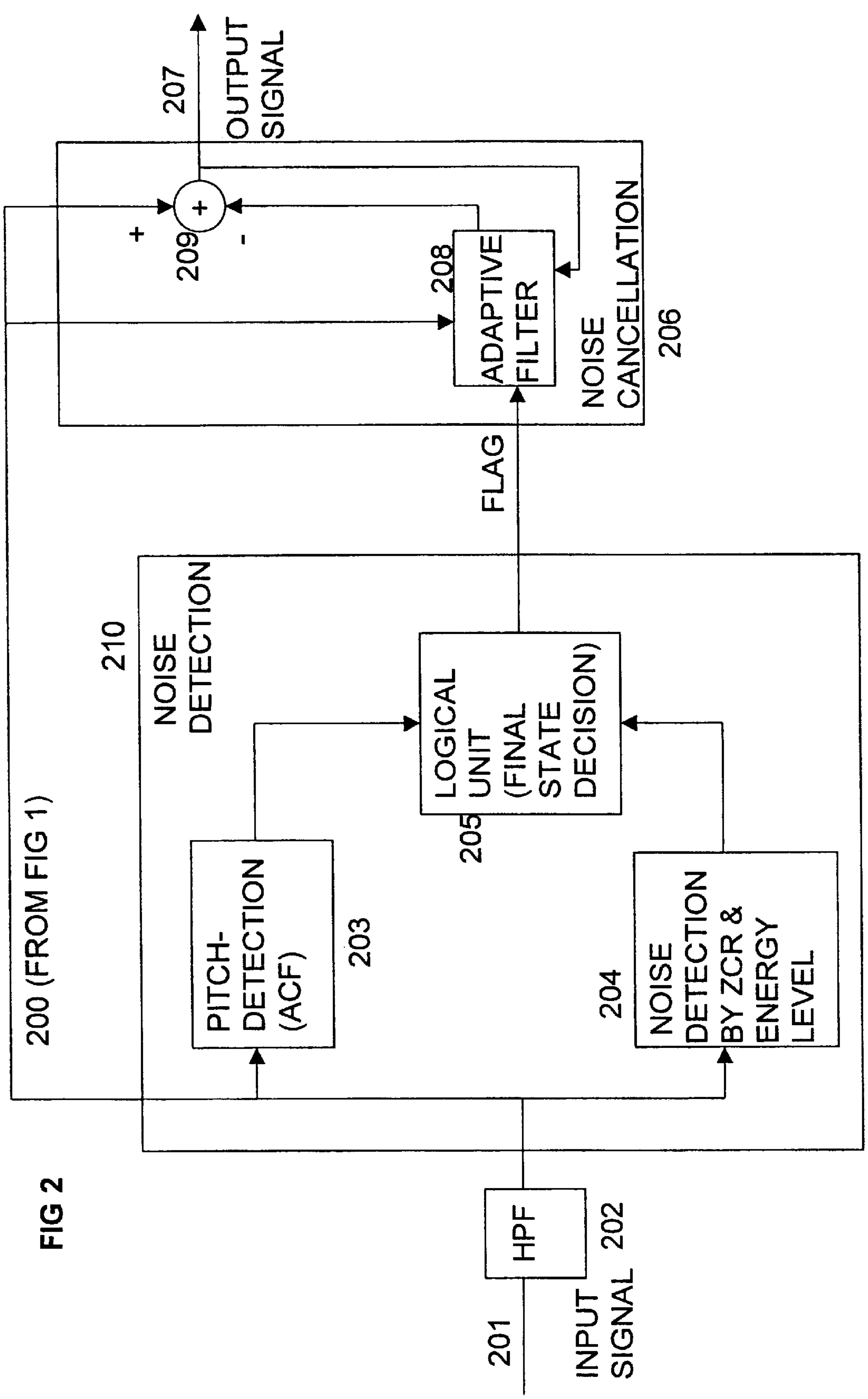
FIG. 2 shows some of the elements within the noise detection and cancellation part of the arrangement of FIG. 1.

FIG. 2, Elements of the Noise Detection and Noise Cancellation Function 105

FIG. 2 shows in schematic form some of the principal elements in the noise detection and cancellation function 105 of FIG. 1. The input signal on the subscriber line 201 is fed through a high pass filter (HPF) 202, to the noise detection part 210 (comprising parts 203, 204 and 205, described below). At least where an adaptive filter carries out noise cancellation, it is useful to have a noise detection stage to ensure that the adaptive filter adapts only to the noise, and not to desired parts of the signal.

The noise detection part includes a pitch detection function 203, and a parallel function 204 for noise detection using other methods such as zero crossing rate (ZCR), and energy level. The two noise detection units 203 and 204 feed a provisionally state decision for the presence of noise, or desired signal, into a logical unit 205 which carries out further processing to output a final state decision.

The final state decision in the form of a flag is output to the noise cancellation 206. This includes an adaptive filter 208, which outputs a representation of a noise to a summation element 209, for cancelling the noise from the original signal. The adaptive filter operates on the basis of the input signal 201 (REF), an error signal in the form of the output signal 207 output by the summation part 209, and on the basis of the flag indicating whether noise or desired signal have been detected. The noise detection may be carried out on a frame by frame basis, as will be described in more detail with reference to FIGS. 3 and 4.

The performance of the noise cancellation part is important for the ECAN. If the noise cancellation part cancels any part of the desired part of the signal, such as the component of the echo from the incoming speech signal, this would reduce the correlation between the incoming speech signal (REF) and the echo. Hence the echo cancellation function would be less effective.

There are various ways of implementing the elements illustrated in FIGS. 1 and 2. Current practice for local switches carrying many hundreds of voice circuits is to carry out much of the signal processing digitally, once the analogue signals have been coded. There are various coding standards, which may be used, including the well-known ITU G700 series. In a typical implementation, each DSP module may handle 4 or 5 channels simultaneously, and carry out coding, echo cancellation, noise cancellation, DTMF tone detection and if appropriate, voice activity detection. The latter enables more efficient use of bandwidth by not transmitting frames that contain only silence. Typically 50% of a telephone conversation is silence.

The number of channels that can be handled by each DSP gives the channel density, and it is desirable to reduce the amount of calculation needed for each channel, so as improve the channel density. In a current conventional implementation using a 100 MIP (Million Instructions Per Second) DSP, depending on the configuration, typically each channel uses 10–15 MIPS for CODEC, 2 to 3 MIPS for ECAN, 1.5 MIPS or more for conventional DTMF tone detection, and noise cancellation may take up another 2 to 3

MIPS. The MIPS used for tone detection can be reduced considerably using the pitch period detection method described below, down to <0.2 MIPS per channel.

The noise detection state output can be passed to higher data management layers to trigger insertion of other data traffic e.g. non real time data traffic, if silence suppression is to be implemented. An example of such higher layers would be software layers for managing the process of filling ATM (Asynchronous Transfer Mode) cells by multiplexing voice and data traffic. Such techniques are well known and need not be described here in more detail. Such data can be extracted from the cells at the receiving end, and the voice signal restored, typically by adding simulated "comfort noise".

Figure 3:
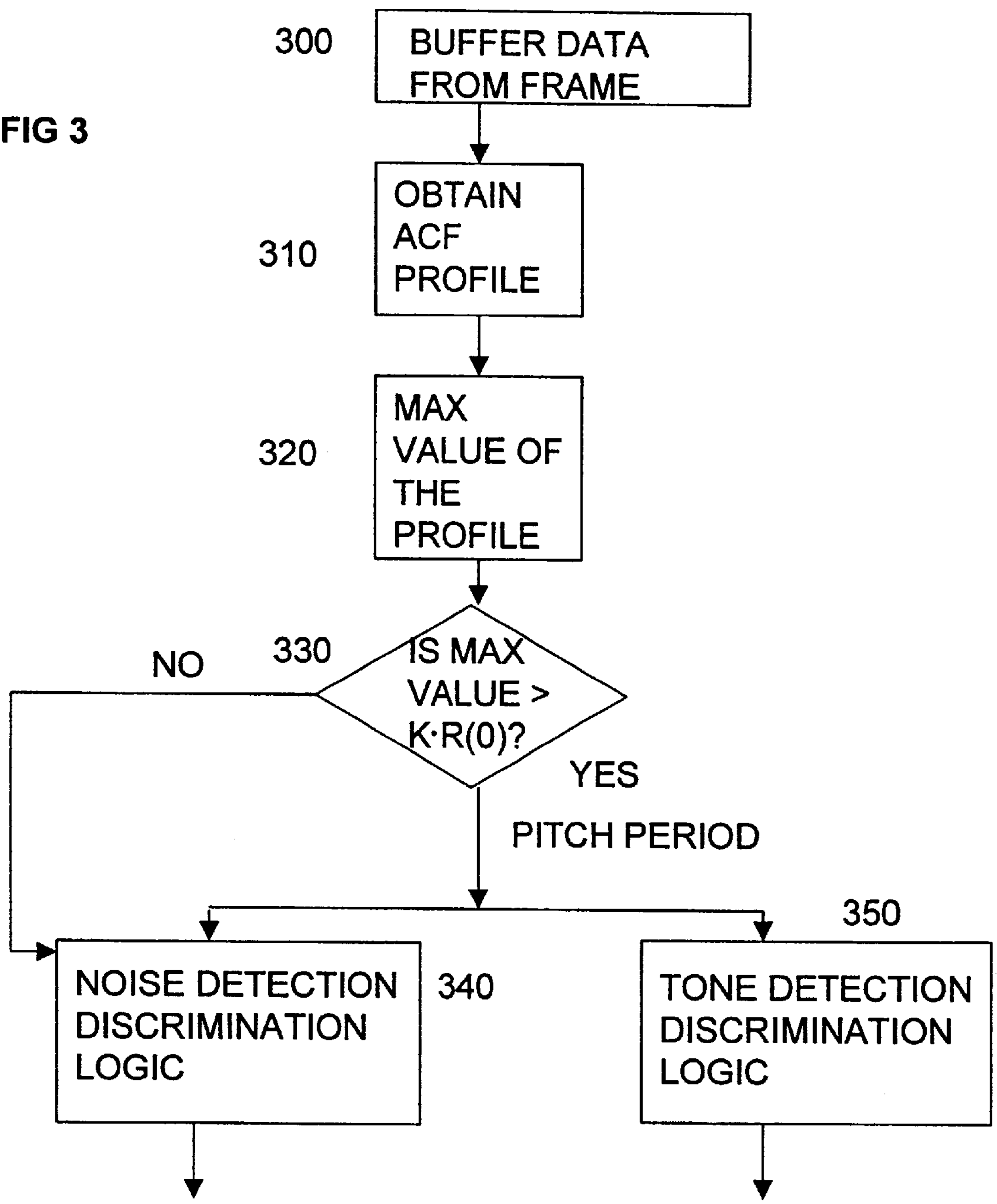
FIG. 3 shows some of the steps in the operation of the noise detection part of FIG. 2.

FIG. 3, Operation of the Pitch Detection Part.

The pitch detection part 203 may be carried out in various ways. In this embodiment, an auto correlation function (ACF) method is preferred. At step 300, raw data from a given frame of the input signal is buffered. At step 310 the auto correlation is carried out. This involves comparing the samples from the frame with a delayed version of the same frame, and determining how closely they match. The matching can be done by multiplying each sample with a respective delayed sample, and summing the products to obtain one correlation value for each delay. Where there are 24 samples in the frame, the correlations can be carried out with up to 48 different offsets or delays. To obtain a complete correlation profile, a correlation value should be obtained for each of these 48 different offsets. Any peaks in this correlation profile can represent pitch periods, if the peaks are above a certain threshold, and the offset or delay that results in the peak, is the pitch period value.

For determining the presence of such pitch periods to detect voice or tones, it is not necessary to calculate the correlation profile over the entire range of offsets. A range of 3 to 14 milliseconds of offset will be sufficient to cover all the frequencies of interest in the speech and in the tones. Since determining the correlation profile is computationally intensive, a valuable reduction in the amount of calculation can be achieved by limiting the range of offset for which the correlation profile is determined.

At step 320, the profile is analysed to determine if there are any peaks that would indicate the presence of a pitch period. Provided the peak has a magnitude of greater than a threshold such as one-third of the normalised maximum signal power, the decision is made at 330 that a pitch period is present in that frame. The normalised maximum signal power may be represented as R(0), and the proportion as a constant K, as shown in the figure.

The result in terms of a binary value for the presence of a pitch period is then fed into noise detection discrimination logic 340 and simultaneously fed to tone detection discrimination logic 350 for use in the tone detection part 209 of FIG. 1.

FIG. 4, Noise Detection Discrimination Logic 340.

The binary value indicating noise or desired signal (speech or a tone) is then confirmed or otherwise using another noise detection technique such as ZCR or energy level detection, at step 410, at discussed above.

The detection can be biased towards detecting speech, to avoid any clipping of the speech, by confirming noise detection only when more than one method of detecting noise, or all the different methods of detecting noise agree that noise has been detected.

The logic unit 420 then carries out further processing. This logic unit is capable of storing the states of previous frames, so that for any given frame, the state of both preceding and succeeding frames can be used to give a better determination of noise. Particular cases are analysed in parallel, as shown in steps 430–470.

At step 430 the state of the given frame is compared to the previous frame and a succeeding frame to detect instances where a single voice frame is surrounded by noise frames. In this case it is assumed that the single voice frame is not a true voice signal, and may have been caused by peaky noise. According, the status of such single voice frames is changed to noise.

At step 440 steps are taken to detect low energy speech phonemes such as SH, S, H, TH, F and V. These can sound similar to noise and therefore further processing is carried out to determine if frames previously detected as noise should be reclassified as speech. The states determined for the past 4 or 5 frames are stored and used to detect such phonemes, based on pitch period, energy and ZCR characteristics. The detection state of such past frames may then be changed from noise to speech before the states are output.

At step 450 steps are taken to detect voice or unvoiced stops in speech such as B,G,D/K, P, T. Such sounds are preceded by silence that should be regarded as part of the speech. Detection of such sounds can again be carried out using the stored characteristics for the last 4 or 5 frames. Accordingly, such frames can be reclassified as speech. At step 460 front end clipping of words is avoided by reclassifying the last few frames of silence before the start of a word, to give a small guardband.

At step 470, a similar process is carried out to carry to avoid clipping the ends of words, by reclassifying the first few frames of silence after a word, as speech. This is termed "hang-over time". At step 480 , the final state of each given frame is output.

Figure 5:
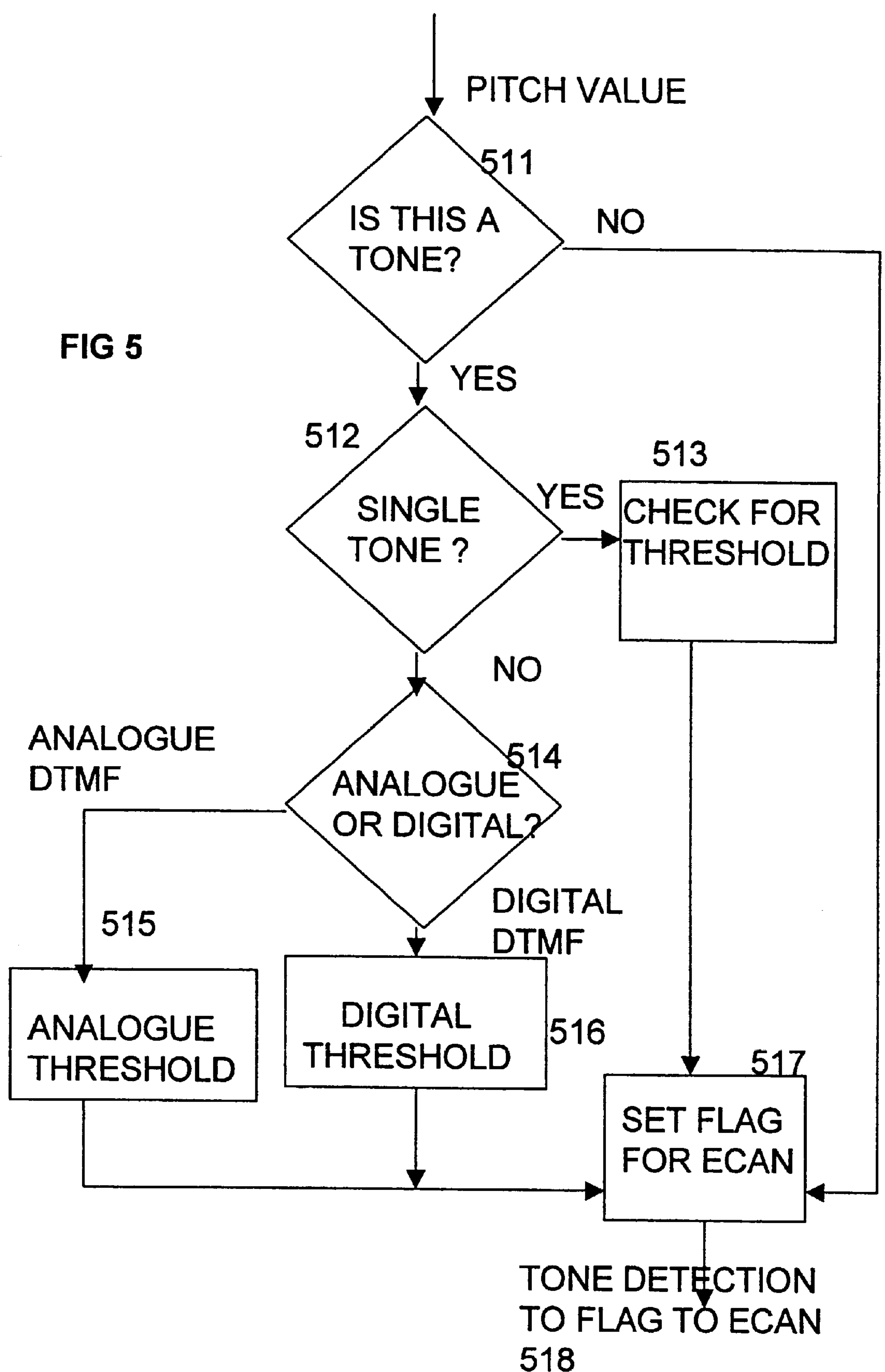
FIG. 5 shows some of the steps of the tone detection part of FIG. 1.

FIG. 5, Operation of the Tone Detection Discrimination Logic.

The pitch period detection operation shown in FIG. 3 can output more than just a status flag to indicate whether a pitch period has been detected. Where a pitch period has been detected, then a value for the pitch period is output, in terms of the offset at which the peak was detected. At step 511 this value is used to detect whether it corresponds to a tone. This can be done using as a look-up table. Since tones have well defined frequencies, this test may be arranged to give a positive result only if there is an exact match with one of the predetermined offsets corresponding to the known tones. If there is no match, at step 517, the flag is set for non-presence of tone and output at 518.

If the test for a tone gives a positive result, at step 512 it is tested whether the tone is a single frequency tone. If so, at step 513 it is determined whether the same frequency of tone has been detected in the preceding few frames and if so, the flag is set to indicate a tone. Otherwise, it is assumed that the tone is not present, and the flag is set accordingly.

If step 512 does not indicate a single frequency tone, it is assumed that it is a multiple frequency tone, and at step 514 it is tested whether the tone is an analogue or a digital multiple frequency tone. This is carried out by threshold tests 515 and 516 respectively. The analogue threshold function determines if the tone is maintained longer than a given duration, and if so, causes the output flag to be set. The digital threshold function checks for a predetermined pattern of presence and absence of tone to indicate a digital DTMF. The output flag indicating presence of tone is set accordingly.

The tone detection function could be arranged to simply output a flag indicating the presence of a tone, for use by the echo cancellation function for example, or outputs indicating which type of tone has been detected, and its frequency or frequencies, are conceivable.

The output of the tone detection function could also be passed to a codec (not shown) such as a codec using the G729 standard. This is an example of a standard that can be implemented so as to avoid coding tones. If this is done, it is useful to detect the tones as quickly as possible to avoid a number of problems. If tones are normally detected and interpreted using a tone decoder, before being transmitted encoded differently to the speech signal, there is a risk that the first part of the tone is not detected in time. In this case the first part would be encoded and transmitted without being interpreted. This first part might then be detected as a tone at the receiving side. The remainder of the tone would also be transmitted, coded differently, then regenerated as a tone. This can result in mistaken detection of two distinct tones at the receiving side. Such codec functions can be implemented using well-known principles which need not be described further here.

Figure 6:
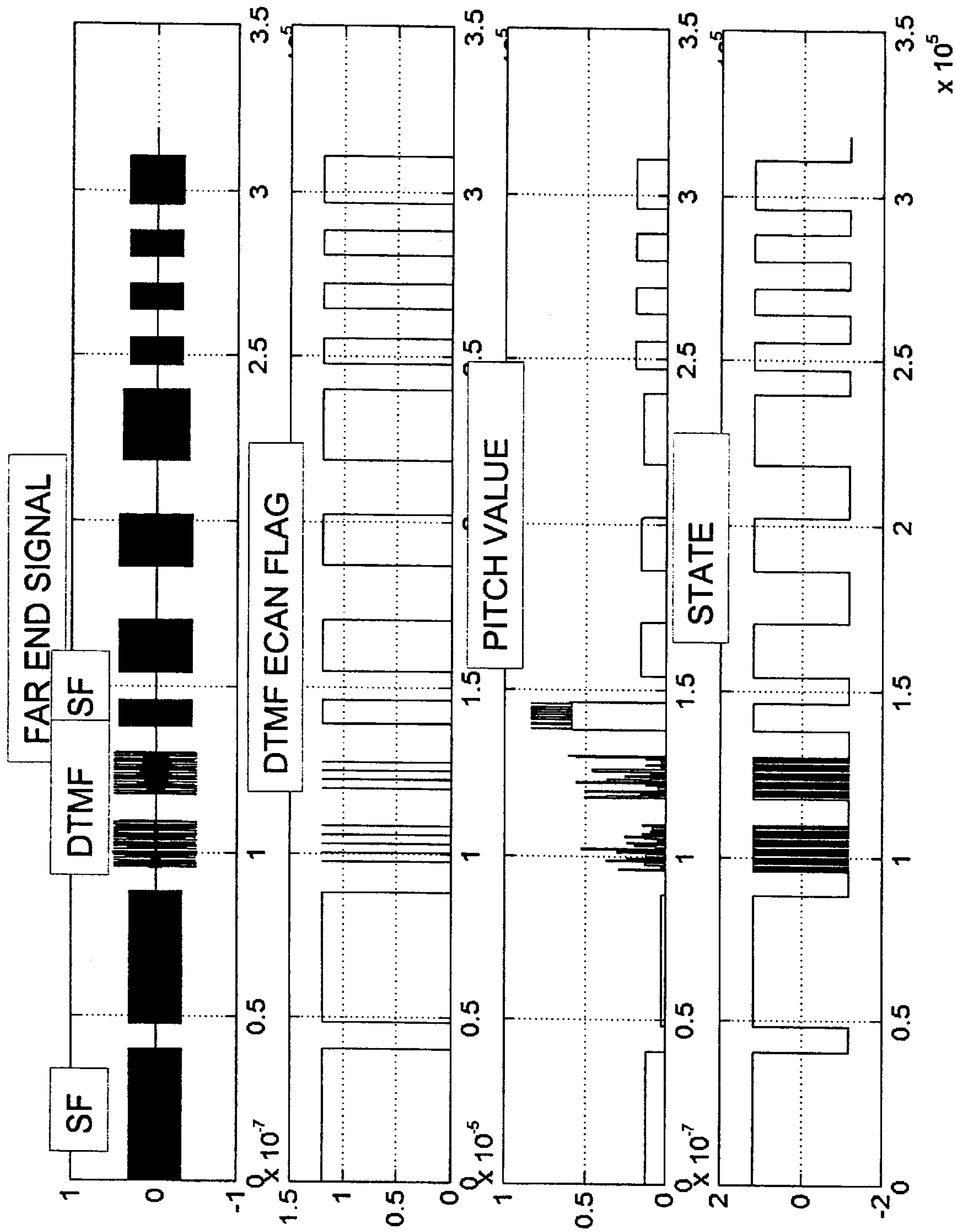
FIG. 6 shows examples of tones, together with the resulting DTMF flag output, pitch period value outputs, and pitch period detection state output.

FIG. 6, Tone Detector Outputs

FIG. 6 shows responses of parts of the tone detector function to a typical incoming signal. The incoming signal from the far end is shown in the top line. It shows a variety of tones beginning with 2 single frequency tones (SF) followed by 2 sets of DTMF tones, then 8 further SF tones of various magnitudes. The second line from the top shows the binary DTMF ECAN flag that is on for each of the single tones, and shows a number of peaks for each of the DTMF tones.

The third line from the top shows the magnitude of the pitch period value detected by the pitch period detector. The bottom line of figures shows the pitch period detection state output of the pitch period detector.

The tones that could be detected include pure tones such as fax, modem, dial tone and continuity tone, as well as multi-frequency tones such as DTMF, Rl, and R2 signalling.

Other Examples, Variations

Although the embodiments described show a noise detector making use of the same pitch period calculation, of course other ways of detecting noise could be used. Although the embodiments described show using an auto correlation function, other methods for determining pitch period could be used.

References to software are intended to encompass at least software stored on a computer readable physical medium, and software delivered as a signal transmitted over a transmission medium.

Other variations of the described embodiments, and other applications of the invention can be conceived and are intended to be within the scope of the claims.

What is claimed is:

1. Apparatus for detecting a tone in an input signal, the apparatus comprising:

a pitch period detector for detecting a pitch period in the input signal, and a discriminator for determining the presence of the tone according to the analysis of the pitch period.

2. The apparatus of claim 1, the pitch period detector comprising an auto correlator for outputting an auto correlation function of the input signal.

3. The apparatus of claim 2, the pitch period detector comprising a peak detector for detecting a peak in the auto correlation function and a comparator for comparing the peak with a total signal power of the input signal, to detect a pitch period.

4. The apparatus of claim 2, the auto correlator being arranged to calculate the auto correlation function for selected offsets which have durations corresponding to a range of pitch periods for a human voice.

5. The apparatus of claim 1, the discriminator being arranged to compare a detected pitch period with a predetermined pitch period corresponding to a given tone, to discriminate the presence of that tone.

6. The apparatus of claim 1 wherein the tone is a multi-frequency tone.

7. The apparatus of claim 1 the pitch period detector being operable to detect a series of pitch periods in the input signal at successive time intervals the discriminator being operable to determine the presence of the tone according to the series of pitch periods.

8. The apparatus of claim 1, the discriminator being arranged to determine the pitch period of a sequence of samples, and discriminate from the sequence, the presence of the tone.

9. The apparatus of claim 5 wherein the given tone is a multifrequency tone.

10. Signal processing apparatus for processing an input signal, the apparatus comprising:

a pitch period detector for detecting a pitch period in the input signal, a discriminator for determining the presence of a tone according to the analysis of the pitch period, and a noise detector for determining the presence of noise according to the analysis of the pitch period.

11. The signal processing apparatus of claim 10, the pitch period detector comprising an auto correlator for outputting an auto correlation function of the input signal.

12. Echo cancelling apparatus for cancelling echoes in an input signal, the apparatus comprising a tone detector, the apparatus being arranged to cancel the echoes according to an output of the tone detector, the tone detector comprising:

a pitch period detector for detecting a pitch period of the input signal, and a first discriminator for determining the presence of the tone according to the analysis of the pitch period.

13. Speech coding apparatus for coding an input signal, the apparatus comprising a tone detector, the coding apparatus being arranged to code the input signal according to an output of the tone detector, the tone detector comprising:

a pitch period detector for detecting a pitch period of the input signal, and a discriminator for determining the presence of the tone according to the analysis of the pitch period.

14. A method of detecting a tone in an input signal, comprising the steps of:

detecting a pitch period of the input signal, and determining the presence of the tone according to the analysis of the pitch period.

15. A method of using a telecommunications network to make a call, the network comprising a tone detector, wherein making the call causes the tone detector to detect a tone in the call by:

detecting a pitch period in the call, and determining the presence of the tone according to the analysis of the pitch period.

16. Software for carrying out a method of detecting a tone in an input signal, the method comprising the steps of:

detecting a pitch period of the input signal, and determining the presence of the tone according to the analysis of the pitch period.

* * * * *